US012679557B2

(12) United States Patent
Cooke

(10) Patent No.: US 12,679,557 B2
(45) Date of Patent: Jul. 14, 2026

(54) METHOD FOR DETERMINING AT LEAST ONE POSITION OF A MOBILE STRUCTURE OF AN AIRCRAFT FROM ITS SPEED AND AIRCRAFT COMPRISING A DEVICE FOR EXECUTING IT

(71) Applicant: Airbus SAS, Blagnac (FR)

(72) Inventor: Cameron Cooke, Blagnac (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 19/037,862

(22) Filed: Jan. 27, 2025

(65) Prior Publication Data

US 2025/0242939 A1 Jul. 31, 2025

(30) Foreign Application Priority Data

Jan. 29, 2024 (FR) ................................... FR2400811

(51) Int. Cl.
| | |
|---|---|
| *B64D 45/00* | (2006.01) |
| *B64C 25/10* | (2006.01) |
| *B64C 25/42* | (2006.01) |
| *G01S 13/58* | (2006.01) |

(52) U.S. Cl.
CPC .......... *B64D 45/0005* (2013.01); *B64C 25/10* (2013.01); *B64C 25/42* (2013.01); *G01S 13/583* (2013.01)

(58) Field of Classification Search
CPC ....... B64C 25/10; B64C 25/42; B64C 25/426; B64D 45/0005
See application file for complete search history.

(56) References Cited

U.S. PATENT DOCUMENTS

2022/0348318 A1* 11/2022 Howell ................. B64C 25/426

FOREIGN PATENT DOCUMENTS

| | | |
|---|---|---|
| EP | 4082900 A1 | 11/2022 |
| GB | 2587416 A | 3/2021 |

OTHER PUBLICATIONS

French Search Report for corresponding French Patent Application No. 2400811 dated Jul. 9, 2024.
J. Au et al., "Challenges and Opportunities in Aircraft Landing Gear" 2022 IEEE Aerospace Conference, Mar. 5, 2022; pp. 1-10.

* cited by examiner

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A method of determining at a given time at least one position of a mobile structure by determining at least one speed of the mobile structure at the given time, comparing the speed determined with listed speeds each associated with a listed position, and determining the position of the mobile structure at the given time that corresponds to the listed position associated with the listed speed equal to or closest to the speed determined at the given time. Also, a device for executing the method and an aircraft including at least one such device.

13 Claims, 1 Drawing Sheet

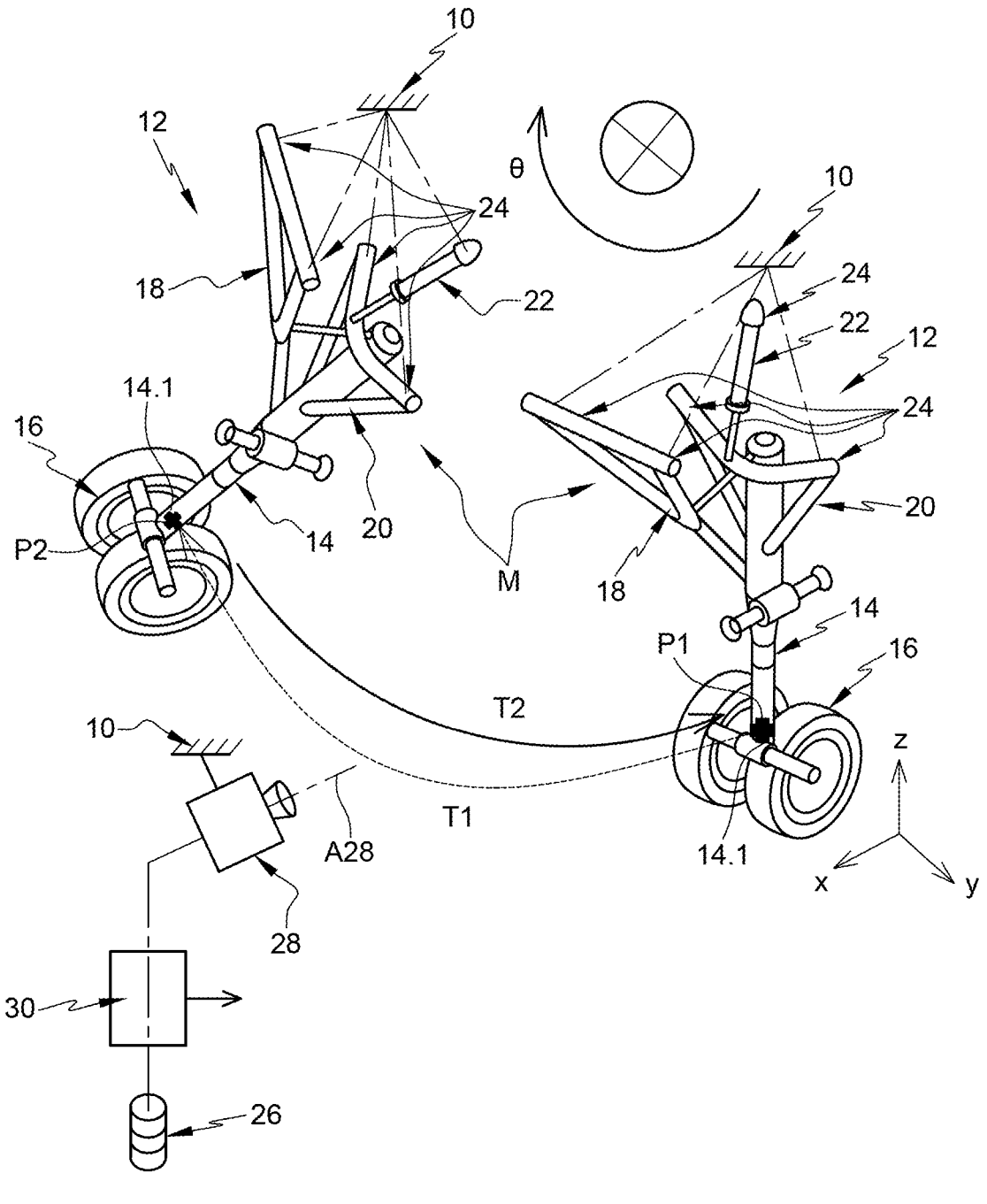

METHOD FOR DETERMINING AT LEAST ONE POSITION OF A MOBILE STRUCTURE OF AN AIRCRAFT FROM ITS SPEED AND AIRCRAFT COMPRISING A DEVICE FOR EXECUTING IT

CROSS-REFERENCES TO RELATED APPLICATIONS

This application claims the benefit of French Patent Application Number 2400811 filed on Jan. 29, 2024, the entire disclosure of which is incorporated herein by way of reference.

FIELD OF THE INVENTION

The present invention relates to a method for determination of at least one position of a mobile structure of an aircraft from its speed and an aircraft comprising a device for executing it.

BACKGROUND OF THE INVENTION

In one embodiment an aircraft comprises a plurality of landing gears each mobile between retracted and deployed positions and for each of them a landing gear well configured to accommodate the landing gear in the retracted position.

Each landing gear comprises various elements articulated relative to one another and actuators for moving the landing gear between the retracted and deployed positions.

Each landing gear well comprises at least one door mobile between an open position in which the door enables the landing gear to be in a deployed position and a closed position in which the door closes the landing gear well when the landing gear is in the retracted position.

The aircraft also comprises sensors for determining the position of each door of each landing gear well and of some articulated elements and/or actuators of each landing gear.

In one embodiment each of these sensors is a proximity sensor enabling determination of a unique position of a mobile element such as one of the articulated elements, actuators or doors. In one configuration, for a given mobile element, the aircraft therefore comprises two proximity sensors positioned at the two ends of the travel of the given mobile element.

This embodiment is not entirely satisfactory because it necessitates a large number of proximity sensors and considerable wiring, which impacts the mass of the aircraft and its maintenance.

Another disadvantage of this embodiment is that it does not enable the position of a mobile element to be determined when the latter is not located at one of the ends of its travel.

The present invention aims to remedy some or all of the foregoing disadvantages of the prior art.

SUMMARY OF THE INVENTION

To this end the invention has for an object a method for determining at a given time at least one position of a mobile structure of an aircraft, said mobile structure being moved in at least one movement between first and second positions and configured to occupy intermediate positions between the first and second positions.

According to the invention the method comprises, beforehand, a step of generating at least one list for the movement associating the listed positions and speeds of the mobile structure, the listed positions comprising the first and second positions and the intermediate positions, each of said listed positions being associated with a listed speed and, in operation, a step of determining at least one speed of the mobile structure at the given time, a step of comparing the speed determined with the listed speeds each associated with a listed position, and a step of determining the position of the mobile structure at the given time that corresponds to the listed position associated with the listed speed equal to or closest to the speed determined at the given time.

In contrast to the prior art, this method of determining at least one position of the mobile structure enables determination of the position of the mobile structure at all times and not only at the beginning and at the end of the movement using a restricted number of speed determination systems.

In one variant the step of determining a speed of the mobile structure consists in capturing first and second images separated by a given time period in which the mobile structure is visible, determining a change of scale between the first and second captured images, and calculating the speed of the mobile structure from the given time period and the change of scale between the first and second captured images.

In another variant the step of determining a speed of the mobile structure consists in determining a frequency shift for a wave emitted and received by a radar after it has been reflected by the mobile structure and calculating the speed of the mobile structure from the frequency shift determined previously.

In accordance with another feature the speed of the mobile structure is equal to a mean value of the measured speeds.

In accordance with another feature the step of generating the list consists in moving the mobile structure in the movement and, for each position listed in the list, a step of determining the speed of the mobile structure and associating the speed determined with said position in the list.

In accordance with another feature the step of generating the list is carried out only once.

In accordance with another feature the method comprises a step of updating the speeds listed in the list on the basis of the measured speeds used to determine the position of the mobile structure.

The invention also has for object a device that comprises:

at least one storage unit configured to store a list associating listed positions and speeds of the mobile structure, at least one speed determination system configured to evaluate or to measure a speed of the mobile structure, at least one processor unit configured to compare at least one speed measured by the speed determination system and the listed speeds and to determine the position of the mobile structure as a function of said comparison.

In accordance with another feature the speed determination system comprises at least one video camera such as a Lidar video camera or a time of flight video camera or at least one radar utilizing the Doppler effect.

In accordance with another feature the device comprises a plurality of speed determination systems.

The invention also has for object an aircraft comprising at least one device for determining at least one position of a mobile structure having any of the above features.

BRIEF DESCRIPTION OF THE DRAWING

Other features and advantages will emerge from the following description of the invention given by way of example with reference to:

FIG. 1 which is a perspective view of an aircraft landing gear occupying two positions and depicts one embodiment of the invention.

DETAILED DESCRIPTION OF THE PREFERRED EMBODIMENTS

As depicted in FIG. 1 an aircraft comprises a fixed structure 10 and at least one landing gear 12 mobile relative to the fixed structure 10, moved with a first movement T1 from a first so-called deployed position P1 to a second so-called retracted position P2, and a second movement T2 from the second position P2 to the first position P1.

In an embodiment visible in FIG. 1 the landing gear 12 comprises a leg 14, at least one wheel 16 connected to a first end 14.1 of the leg 14, at least one strut 18 connecting the leg 14 and the fixed structure 10 of the aircraft, at least one brace 20, at least one actuator 22 and articulations 24 connecting the leg 14, the wheel or wheels 16, the struts 18, the brace or braces 20 and the actuator or actuators 22 together and/or to the fixed structure 10.

Regardless of the embodiment the landing gear 12 is a mobile structure M configured to be moved relative to the fixed structure 10 between first and second positions P1, P2, including mobile elements consisting of the leg 14, the wheel or wheels 16, the strut or struts 18, the brace or braces 20, the actuators or actuators 22 and the articulation or articulations 24.

Additionally, the aircraft comprises at least one landing gear well rigidly fastened to the fixed structure 10 and configured to accommodate the landing gear 12 in the retracted position. Each landing gear well comprises at least one door mobile relative to the fixed structure 10 between an open position in which the door allows the landing gear 12 to be in the deployed position and a closed position in which the door closes the landing gear well when the landing gear 12 is in the retracted position.

Each door of a landing gear well of the aircraft is a mobile structure M configured to be moved relative to a fixed structure 10 including at least one mobile element and in first and second round-trip movements T1, T2 between closed and open positions.

Regardless of the embodiment the aircraft comprises at least one mobile structure M configured to be moved relative to a fixed structure 10 in at least one movement T1, T2 from a first extreme position P1 to a second extreme position P2, said mobile structure M being either an aircraft landing gear 12 or a door of an aircraft landing gear well.

In one configuration the mobile structure M pivots about a pivot axis relative to the fixed structure 10 between first and second extreme positions P1, P2 that respectively correspond to the lowered and retracted positions. Of course, the invention is not limited to this kinematic.

During a given movement T1, T2 between the first and second extreme positions P1, P2 the mobile structure M is configured to occupy intermediate positions Pi distributed between the first and second extreme positions P1, P2.

In each movement T1, T2 the mobile structure M has a speed that varies between the first and second extreme positions P1, P2. In one configuration, during each movement the speed of the mobile structure M is zero at the start of the movement, increases and then decreases to zero again at the end of the movement.

A method of determining at least one position of the mobile structure M comprises a step of generating at least one list for at least one movement T1, T2 of the mobile structure M, said list associating positions in the movements T1, T2 and speeds of the mobile structure M and each of said positions listed in the list being associated with a listed speed. In one mode of operation the step of generating the list consists in moving the mobile structure M in the movement T1, T2 and, for each position listed in the list, a step of determining the speed of the mobile structure M when it occupies said position and associating the speed determined with said position in the list. The listed positions consist of the first and second extreme positions P1, P2 and the intermediate positions Pi.

The step of generating the list is carried out only once, in particular before the aircraft is operated.

In one embodiment in order to carry out the measurements a device for determining at least one position of the mobile structure M comprises at least one system for determining a speed configured to evaluate or to measure a speed of the mobile structure M when it occupies a given position. Additionally, the device for determining at least one position of the mobile structure M comprises at least one storage unit 26 configured to store the list associating the speeds and the positions of the mobile structure M from the first and second extreme positions P1, P2 and the intermediate positions Pi, each position listed in the list being associated with a listed speed.

The method for determining at least one position of the mobile structure M comprises a step of determining at least one speed of the mobile structure M, a step of comparing the previously measured speed with the listed speeds each associated with a listed position, and a step of determining the real position of the mobile structure M that corresponds to the listed position associated with the listed speed equal to or closest to the measured speed.

To this end the device for determining at least one position of the mobile structure M comprises at least one system 28 for determining speeds rigidly fixed to the fixed structure 10 and configured to evaluate or to measure a speed of the mobile structure M and at least one processor unit 30 configured to compare speeds measured by the speed determination system 28 and the listed speeds and to determine the real position of the mobile structure M as a function of that comparison.

This processor unit 30 may be a computer of the aircraft dedicated exclusively or not to these comparison and determination functions. Similarly, the storage unit 26 may be storage unit of the aircraft dedicated exclusively to storing the list or lists.

In one embodiment the same speed determination system 28 may be used to generate the list and to determine the real position of the mobile structure M.

In one embodiment the speed determination system 28 comprises at least one video camera such as a Lidar video camera or a time of flight (TOF) video camera. In this embodiment the step of determining a speed of the mobile structure M consists in capturing two successive images separated by a given time in which a mobile structure M is visible, determining a change of scale between the two captured images, and calculating the speed of the mobile structure from the given time and the change of scale between the two captured images. The change of scale corresponds to a ratio between a first distance separating two points on the mobile structure M in the first image and a second distance separating the same points on the mobile structure M in the second image.

In another embodiment the speed determination system 28 comprises at least one radar utilizing the Doppler effect and configured to measure the speed of the mobile structure M from a frequency difference of a wave between its emission and its reception. In this embodiment the step of determining a speed of the mobile structure M consists in determining a frequency shift for a wave emitted and received by the radar after it has been reflected by the mobile structure M and calculating the speed of the mobile structure M from the frequency shift previously determined.

In one configuration each speed determination system 28 has an aiming axis A28 and is connected to the fixed structure 10 so that its aiming axis A28 is correctly positioned relative to the movement T1, T2 of the mobile structure M in order to optimize the determination of the change of scale or the frequency shift. If necessary the device for determining at least one position of the mobile structure M may comprise a plurality of speed determination systems 28 positioned appropriately to optimize the measurement of the speed of the mobile structure M regardless of its position, the speed of the mobile structure M being equal to a mean value of the speeds measured by the various speed determination systems 28.

During operation of the aircraft the kinematic of the mobile structure M may evolve because of the wear of certain elements of the mobile structure M for example. A difference can then appear between the real position and the position determined by the method according to the invention. In one embodiment, to correct any such drift, the method of determining at least one position of the mobile structure M comprises a step of updating the speeds listed in the list on the basis of the speed measurements used for determining the position of the mobile structure M by the speed determination system 28 during operation of the aircraft.

An aircraft may comprise one or more devices for determining at least one position of a mobile structure M, the latter being either an aircraft landing gear 12 or a door of an aircraft landing gear well.

Regardless of the embodiment the method of determining at least one position of the mobile structure M enables, on the basis of at least one measurement of the speed of the mobile structure M at a given time, determination of the real position of the mobile structure M at that given time by comparing the measured speed to listed speeds each associated with a given position. In contrast to the prior art this method of determining at least one position of the mobile structure M enables, on the basis of a restricted number of speed determination systems 28, determination of the position of the mobile structure M at all times and not only at the beginning and at the end of the movement. Knowing the real position of the landing gear at all times it is possible to improve the coordination of the movements of the landing gear and the doors of the landing gear well and thus to optimize the closing of the landing gear well, which is reflected in a reduction of the fuel consumption of the aircraft.

Furthermore, these measurements of the speed of the mobile structure M can enable evaluation of a change of its kinematic and optimization of its maintenance.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining at a given time at least one position of a landing gear of an aircraft, said landing gear being configured to move based on operation of a controller which is configured to execute said method, said landing gear being moved in at least one movement between a first position and a second position and configured to occupy intermediate positions between the first position and the second position, wherein the method comprises:

generating, beforehand, at least one list for the at least one movement associating listed positions and speeds of the landing gear, the listed positions comprising the first position, the second position, and the intermediate positions, each of said listed positions being associated with a listed speed;

determining, in operation, at least one speed of the landing gear at a given time;

comparing the at least one speed with the listed speeds each associated with a listed position;

determining a position of the landing gear at the given time that corresponds to the listed position associated with the listed speed equal to or closest to the at least one speed determined at the given time; and, updating the listed speeds in the at least one list based on measured speeds used to determine the position of the landing gear.

2. The method according to claim 1 wherein the determining the at least one speed of the landing gear comprises:

capturing a first image and a second image separated by a given time period in which the landing gear is visible;

determining a change of scale between the first image and the second image, and calculating the at least one speed of the landing gear from the given time period and the change of scale between the first image and the second image.

3. The method according to claim 2, wherein the at least one speed of the landing gear is equal to a mean value of calculated speeds.

4. The method according to claim 1, wherein the determining the at least one speed of the landing gear comprises:

determining a frequency shift for a wave emitted and received by a radar after the wave has been reflected by the landing gear, and calculating the at last one speed of the landing gear from the frequency shift.

5. The method according to claim 4, wherein the at least one speed of the landing gear is equal to a mean value of calculated speeds.

6. The method according to claim 1, wherein the generating the list comprises:

moving the landing gear in the movement, and, for each position listed in the list, determining a speed of the landing gear and associating the speed determined with said position in the list.

7. The method according to claim 1, wherein the generating the list is carried out only once.

8. A device for determining at least one position of a landing gear enabling determining at a given time at least one position of a landing gear of an aircraft, wherein the device comprises:

at least one storage unit configured to store a list associating listed positions and speeds of the landing gear;

at least one speed determination system configured to evaluate or to measure a speed of the landing gear, and, at least one processor unit configured to compare at least one speed measured by the speed determination system and the listed speeds and to determine a position of the landing gear as a function of the comparison, wherein the device is configured to perform the method of claim 1.

9. The device according to claim 8, wherein the at least one speed determination system comprises at least one video camera.

10. The device according to claim 8, wherein the at least one speed determination system comprises at least one radar utilizing Doppler effect.

11. The device according to claim 8, further comprising:

a plurality of speed determination systems.

12. An aircraft comprising:

the device according to claim 9.

13. The method according to claim 1, wherein the determining of the at least one speed of the landing gear is done with at least one speed determination system which is rigidly fixed to the aircraft, such that the at least one speed determination system is disposed entirely outside the aircraft.

* * * * *